Dec. 10, 1935. A. O. SAMUELS 2,023,791
LIFTING MEANS FOR WAFFLE IRONS AND OTHER BAKING DEVICES
Filed Nov. 26, 1934
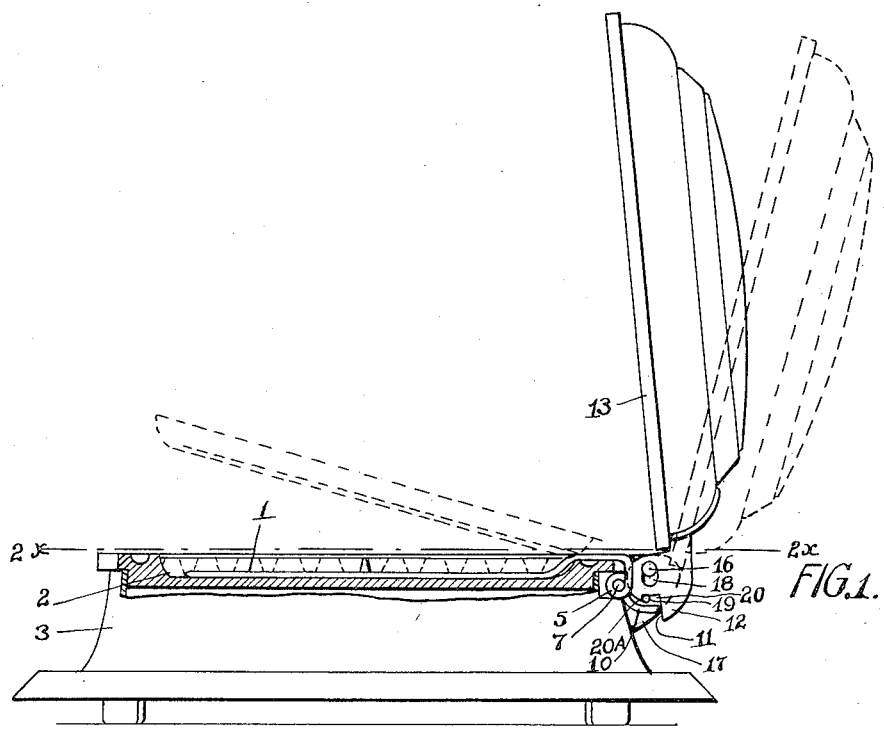
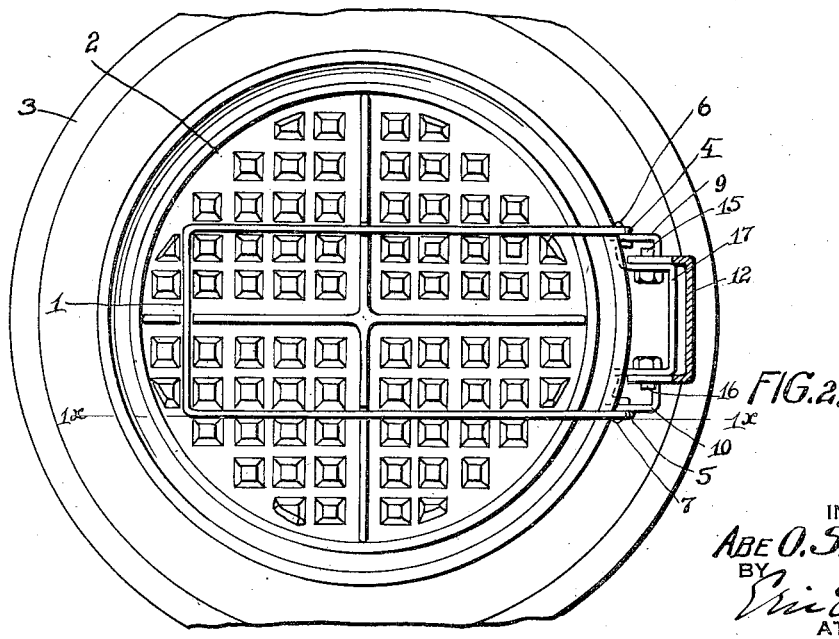
INVENTOR
ABE O. SAMUELS
BY
ATTORNEY Patented Dec. 10, 1935

2,023,791

UNITED STATES PATENT OFFICE 2,023,791

LIFTING MEANS FOR WAFFLE IRONS AND OTHER BAKING DEVICES

Abe O. Samuels, Rochester, N. Y., assignor to Samson-United Corporation, Rochester, N. Y.

Application November 26, 1934, Serial No. 754,765

11 Claims. (Cl. 53—10)

This invention relates to waffle irons and other similar baking devices and has for its object to incorporate a novel device therein for lifting the waffle or other baked product from the baking surface after it has been baked thereon.

Another object of this invention is to so construct the device that the baked article is automatically raised when the baking device is opened.

A further object of this invention is to incorporate the lifting device into a waffle iron so as to have the cover thereof operate it and raise the waffle during part of the movement of the cover.

Another object of this invention is to so combine the device with the waffle iron that its lifting member will be located on the bottom of the grid in an open fixed position of the cover to permit the filling of the grid and hold the lifting member out of the grid for the withdrawal of the waffle therefrom in another fixed position of the cover of the waffle iron.

All these and other objects and attendant advantages of this invention will become more readily apparent from the detailed description thereof which follows, reference being had to the accompanying drawing in which Figure 1 is a side elevation and partial section of a waffle iron provided with my waffle lifting device, the section being taken on the line $1x$—$1x$ in Figure 2.

Figure 2 is a top plan view of the lower grid portion of the waffle iron including the waffle lifting device and a horizontal sectional view of the connection between the lower waffle iron section and its cover section, the section being taken on the line $2x$—$2x$ of Figure 1.

In the figures like reference numerals indicate like parts.

For the purpose of describing my invention I have illustrated the same in combination with a conventional type of electric waffle iron. However it is understood that I do not wish to limit myself to the use of my invention in combination with this type of waffle iron or baking device but consider that I am at liberty to use this invention with other types of waffle irons such as gas heated waffle irons and other baking devices which come fairly within the scope of the appended claims.

As illustrated in the figures, my invention comprises a lifting device made up of a suitable frame 1 which is mounted to swing in and out of the lower grid 2 of the waffle iron 3. In the form shown in the drawing the frame 1 is rectangular in outline and bent up of wire so as to engage between predetermined parallel rows of the lugs of the lower grid of the waffle iron so as to normally rest on the bottom of the grid between the lugs thereof.

The frame 1 is entirely located within the lower waffle grid except for one end which is bent upwardly and outwardly so as to project thru grooves in the top of the grid to the outside thereof where the eyes 4 and 5 are provided thereon. These eyes encircle suitable pivot studs 6 and 7 on which the lifting frame is mounted to swing. Short extensions 9 and 10 extend rearwardly from the eyes 4 and 5 of the lifting frame and are bent toward each other to project in front of the shoulder 11 provided on the hinge member 12 of the cover 13 of the waffle iron.

Hinge member 12 is mounted to swing on the pivot studs 15 and 16 carried by the fixed hinge member 17 of the waffle iron and for this purpose an elongated opening 18 is provided in each side of the hinge member 12 of the cover to have the pivot studs 15 and 16 project therethru. The cover is thus adapted to swing from a horizontal to a vertical position and can be slightly raised in its vertical position for a purpose that will presently appear.

Projecting from one or both sides of the fixed hinge member 17 of the waffle iron is a stop pin 19 which is adapted to project into the segmental groove 20 in the side of the hinge member between the shoulder 11 and a smaller shoulder 20A. In swinging the cover 13 of the waffle iron to a raised position, the stop pin 19 will thus drop into the segmental groove when the cover has reached the full line position illustrated in Figure 1 and then limit the remainder of the movement of the cover to the dotted line position illustrated in the same figure. During this limited end movement of the cover, the shoulder 11 of the hinge member 12 engages the inturned ends of the short extensions 9 and 10 of the lifting frame and moves these ends to cause the frame 1 to swing out of the grid and raise the waffle baked therein into the dotted line position illustrated in Figure 1 to be readily removed therefrom.

To refill the grid with batter for the next waffle the cover is swung forward into the full line position where it is held by the engagement of the shoulder 20A with the stop pin 19 while the lifting frame 1 is allowed to drop back by gravity into the grid and rest on the bottom of it before the batter is poured into the grid. After the grid is filled the cover is slightly raised to disengage the stop pin from the segmental groove of the hinge member 12 and permit the cover 13 to swing down over the grid for the baking operation.

From the foregoing it will be apparent that I have devised a new and useful automatic waffle lifter which embodies the features and advantages enumerated in the statement of the invention, and while I have, in the present instance, shown and described preferred embodiments thereof which will give in practice satisfactory and reliable results, it is to be understood that these embodiments are susceptible of modification in various particulars without departing from the spirit or scope of the invention or sacrificing any of its advantages.

I claim:

1. In a baking device having a movable cover, lifting means associated with the baking surface of the baking device and mounted to swing between said cover and said baking surface of the baking device, and means operated by said cover on the movement thereof for swinging said lifting means at a predetermined position of said cover.

2. In a baking device having a movable cover and a grid, a lifting member mounted to swing in and out of said grid, a connecting member movably connecting said cover to said baking device and means operated by said connecting member for operating said lifting member to swing out of said grid.

3. In a baking device having a swinging cover, a fixed and a moving hinge member connecting said cover to said baking device, a lifting member mounted to swing on said baking device, means provided by said movable hinge member to swing said lifting member out of said waffle iron and means provided on said fixed hinge member and cooperating with means on said movable hinge member to permit the movement of said lifting member into said waffle iron in a predetermined position of said cover.

4. In a baking device having a movable cover and a fixed grid, a lifting member mounted to swing in and out of said grid, means carried by said cover for swinging said lifting member out of said grid during part of its movement and cooperating with said cover to permit the movement of said lifting member into said grid during another part of the movement of said cover.

5. In a baking device having a swinging cover and a fixed grid, a lifting member mounted to swing in and out of said grid, and means operated by said swinging cover at the end of its opening movement to operate said lifting member and swing it out of said grid.

6. In a baking device having a swinging cover and a fixed grid, a lifting member mounted to swing in and out of said grid, means for holding said cover in one position to hold said lifting member away from said grid and holding said cover in another position to cause said lifting member to rest on said grid.

7. In a baking device having a swinging cover and a fixed grid, a hinge member on said baking device and a hinge member on said cover, and means connecting said hinge members to permit a swinging and a limited endwise movement of the cover on the baking device, a lifting member mounted to swing on said baking device and adapted to swing in and out of said grid, means carried by said cover hinge member to engage said lifting member and swing it out of said grid on the swinging of the cover away from the grid and means carried by said cover hinge member and means provided on said baking device hinge member and cooperating with said cover hinge member to limit the movement of said cover toward said grid and permit the lifting member to engage into the grid and hold the cover to permit the filling of the grid with the lifting member in place therein.

8. In a baking device the combination of a hinge member fixedly mounted thereon, a second hinge member mounted to swing on said first hinge member, a cover supported by said second hinge member, a segmental groove formed in the movable hinge member with a shoulder formed at each end thereof, a stop pin carried by said stationary hinge member adapted to engage into said segmental groove of said movable hinge member to limit the movement of said cover between predetermined points on each side of the vertical position of the cover and thus hold said cover in two angular positions on each side of its vertical position, a lifting member mounted to swing in and out of said grid and means operated by said cover on its movement in one direction to one of the angular positions to swing and hold said lifting member out of said grid, said means operating to release said lifting member and permit its movement into the grid on the movement of the cover in the opposite direction to the other angular position thereof.

9. In a baking device having a baking surface and a cover therefor, a pivotal connection between said cover and said baking surface to provide a swinging movement for said cover on said baking surface, a lifting member located between said cover and said baking surface and pivoted on said pivotal connection between said cover and said baking surface to provide a swinging movement for said lifting member with said cover.

10. In a baking device having coacting movable and stationary sections, a material lifting member pivotally mounted on the stationary section at a point externally of said sections and extending over the stationary section and normally resting thereon and mounted to swing towards and away therefrom and means for operating said lifting member.

11. In a baking device having coacting movable and stationary sections, a material lifting member pivotally mounted on the stationary section at a point externally of said sections and extending over the stationary section and normally resting thereon and mounted to swing towards and away therefrom and means engaging the pivoted portion of said lifting member at a point outside of said sections for operating the lifting member.

ABE O. SAMUELS.